US010518395B2

(12) United States Patent
Smith et al.

(10) Patent No.: US 10,518,395 B2
(45) Date of Patent: Dec. 31, 2019

(54) CUFF-BLADE ATTACHMENT BUSHING REMOVAL

(71) Applicant: Sikorsky Aircraft Corporation, Stratford, CT (US)

(72) Inventors: Scott O. Smith, Bedford, TX (US); Sven R. Lofstrom, Irving, TX (US); Philip Petering, Keller, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 16/246,968

(22) Filed: Jan. 14, 2019

(65) Prior Publication Data

US 2019/0143497 A1    May 16, 2019

Related U.S. Application Data

(62) Division of application No. 15/225,091, filed on Aug. 1, 2016, now Pat. No. 10,183,388.

(51) Int. Cl.
| | |
|---|---|
| *B32B 43/00* | (2006.01) |
| *B25B 27/28* | (2006.01) |
| *C09J 5/06* | (2006.01) |
| *B25B 5/00* | (2006.01) |
| *B25B 5/06* | (2006.01) |
| *B25B 27/06* | (2006.01) |

(Continued)

(52) U.S. Cl.
CPC ............. *B25B 27/28* (2013.01); *B25B 5/003* (2013.01); *B25B 5/006* (2013.01); *B25B 5/065* (2013.01); *B25B 27/06* (2013.01); *C09J 5/06* (2013.01); *B25B 27/062* (2013.01); *B32B 38/10* (2013.01); *B32B 43/006* (2013.01); *B64F 5/40* (2017.01); *Y10T 156/1153* (2015.01); *Y10T 156/1168* (2015.01); *Y10T 156/1911* (2015.01)

(58) Field of Classification Search
CPC .. B32B 38/10; B32B 43/006; Y10T 156/1153; Y10T 156/1168; Y10T 156/1911; B64C 27/06; B64F 5/40; B25B 27/06; B25B 27/062
USPC .......................................... 156/711, 714, 752
See application file for complete search history.

(56) References Cited

U.S. PATENT DOCUMENTS

| | | |
|---|---|---|
| 3,339,239 A | 9/1967 | Peck |
| 3,607,545 A | 9/1971 | Parsons et al. |
| 4,855,011 A | 8/1989 | Legge et al. |

(Continued)

FOREIGN PATENT DOCUMENTS

| | | |
|---|---|---|
| EP | 2886206 A1 | 6/2015 |
| WO | 2016060906 A1 | 4/2016 |

*Primary Examiner* — Mark A Osele
*Assistant Examiner* — Nickolas R Harm
(74) *Attorney, Agent, or Firm* — Cantor Colburn LLP

(57) ABSTRACT

A cuff-blade attachment bushing removal tool system includes an alignment plate comprising alignment holes defined through the alignment plate in a pattern of a plurality of bushing holes of a blade root, a bladder plate connected to the alignment plate, and a bladder positioned on the bladder plate such that a gap is formed between the bladder and the alignment plate to receive a blade root to align the alignment holes and the bushing holes of the blade root, wherein the bladder is transitionable between an uninflated position where the blade root can be inserted into the gap and an inflated position where the blade root is clamped between the bladder and the alignment plate.

6 Claims, 3 Drawing Sheets

(51) Int. Cl.
*B32B 38/10* (2006.01)
*B64F 5/40* (2017.01)

(56) References Cited

U.S. PATENT DOCUMENTS

| | | |
|---|---|---|
| 5,862,576 A | 1/1999 | Leahy et al. |
| 5,908,522 A | 6/1999 | Lofstrom et al. |
| RE37,774 E | 7/2002 | Leahy et al. |
| 6,419,183 B1 | 7/2002 | Chen |
| 8,091,419 B2 | 1/2012 | Vontell et al. |
| 2003/0003178 A1 | 1/2003 | Kami et al. |
| 2005/0232757 A1* | 10/2005 | Bruce .................. F01D 17/162 415/160 |
| 2006/0237888 A1 | 10/2006 | Burton et al. |
| 2017/0022968 A1* | 1/2017 | Caruso .................. F03D 1/0675 |
| 2017/0297185 A1* | 10/2017 | Caywood .............. B25B 27/062 |
| 2017/0312944 A1* | 11/2017 | Ivy ....................... B29C 35/0272 |
| 2018/0029210 A1 | 2/2018 | Smith et al. |

* cited by examiner

CUFF-BLADE ATTACHMENT BUSHING REMOVAL

CROSS REFERENCE TO RELATED APPLICATIONS

This application is a divisional of U.S. application Ser. No. 15/225,091, filed Aug. 1, 2016, which is hereby incorporated by reference in its entirety into this application.

BACKGROUND

Field

The present disclosure relates to blades for rotors, more specifically to cuff-blade attachment bushing removal.

Description of Related Art

During rotor blade fabrication, cuff-to-blade attachment bushings are bonded in the composite spar. A challenge during blade overhaul and repair is to remove the bushings to facilitate laminate replacement. Currently, the bushings are machined out which risks damage to the blade.

Such conventional methods and systems have generally been considered satisfactory for their intended purpose. However, there is still a need in the art for improved cuff-blade attachment bushing removal. The present disclosure provides a solution for this need.

SUMMARY

A cuff-blade attachment bushing removal tool system includes an alignment plate comprising alignment holes defined through the alignment plate in a pattern of a plurality of bushing holes of a blade root, a bladder plate connected to the alignment plate, and a bladder positioned on the bladder plate such that a gap is formed between the bladder and the alignment plate to receive a blade root to align the alignment holes and the bushing holes of the blade root, wherein the bladder is transitionable between an uninflated position where the blade root can be inserted into the gap and an inflated position where the blade root is clamped between the bladder and the alignment plate.

The tool can include a plurality of frame arms extending from the alignment plate and the bladder plate and connected together to form a frame of the tool to hold the alignment plate and the bladder plate in position relative to each other. In certain embodiments, the tool can include a bladder retainer connected to the bladder plate to retain the bladder to the bladder plate.

The system can include a plurality of alignment pins configured to insert through the alignment holes and into bushings within the bushing holes. The system can further include a heating rod configured to insert through the alignment holes and into bushings in the bushing holes to uniformly heat the bushings. The system can further include a removal tool configured to insert through the alignment holes and into bushings in the bushing holes and to interface with the bushings to remove the bushings from the bushing holes.

A method for removing a cuff-blade attachment bushing from within one or more of a plurality of bushing holes defined in a blade can include uniformly heating the bushing with a heating rod for a predetermined period of time, and after heating, working the bushing to loosen an adhesive bond between the bushing and its respective bushing hole to remove the bushing from its respective bushing hole. Working the bushing can include using a removal tool. Using the removal tool can include rotating the removal tool to loosen the adhesive bond. In certain embodiments, using the removal tool includes rotating and pulling the removal tool to remove the bushing.

The method can further include aligning a plurality of alignment holes of an alignment plate of a tool with the plurality of bushing holes and inserting an alignment pin into at least two bushings and/or bushing holes before uniformly heating the bushing with the heating rod. The method can include inflating a bladder on an opposite side of the blade relative to the alignment plate to hold the blade within the tool after alignment and before uniformly heating the bushing to maintain pressure on a bond line of laminated layers to prevent delamination. The method can include cleaning the bushing hole to remove excess adhesive.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
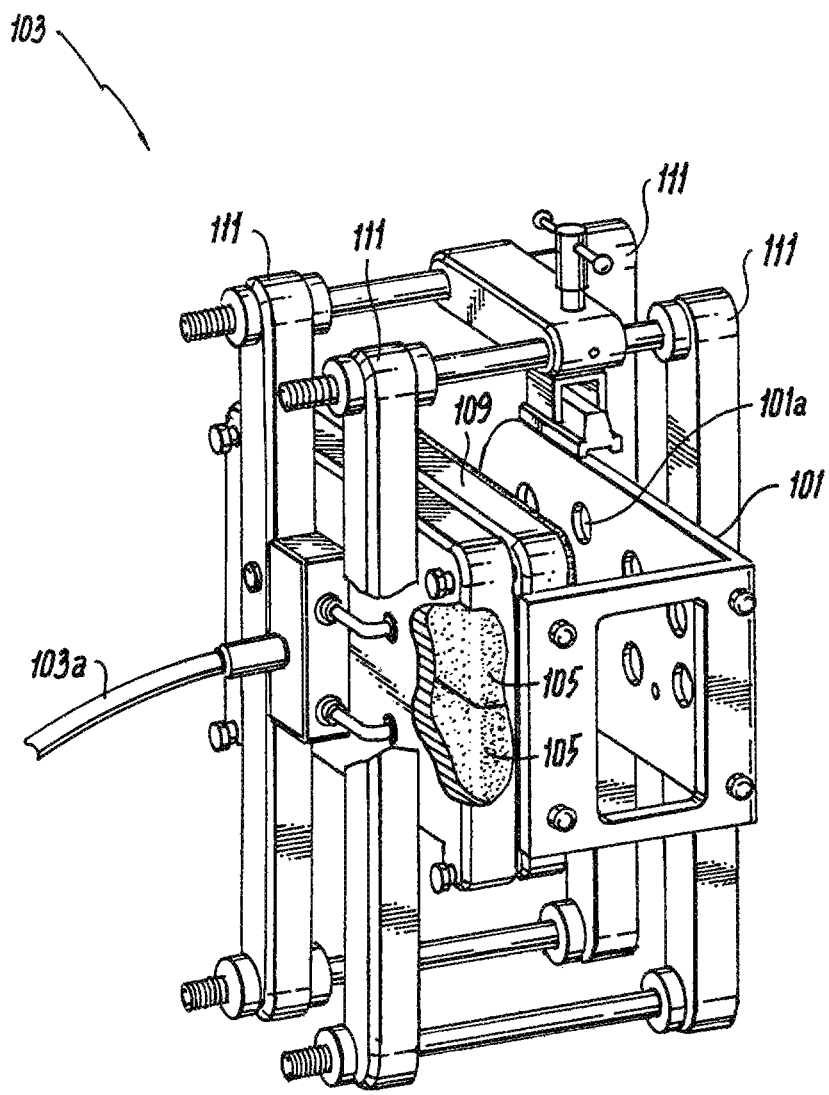
FIG. 1 is a perspective view of an embodiment of tool in accordance with this disclosure.
Figure 2:
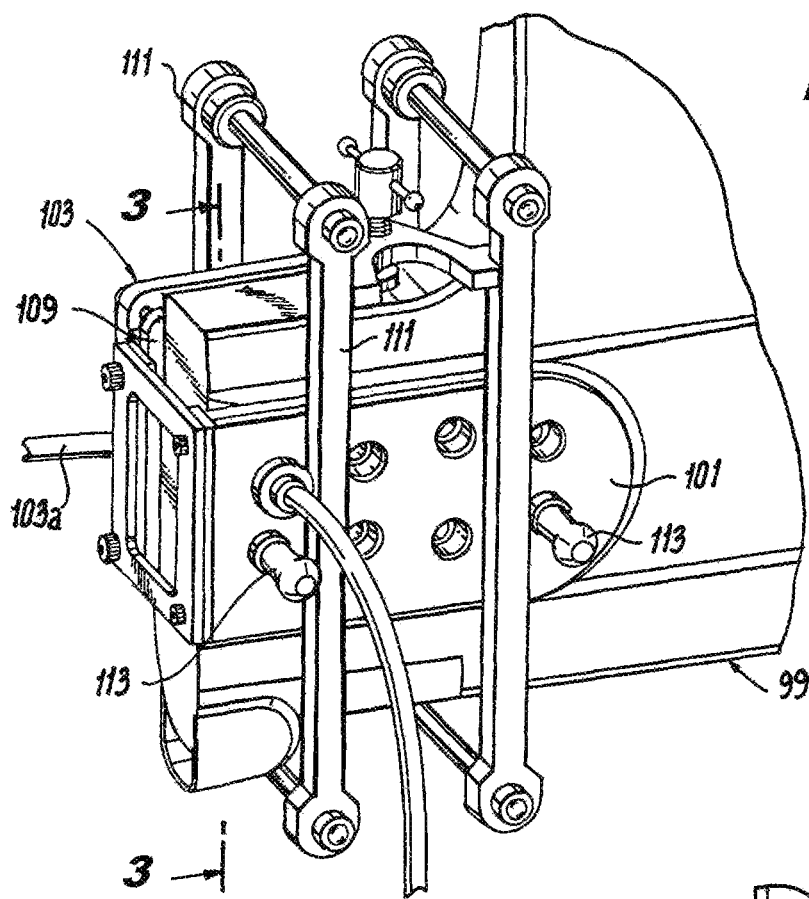
FIG. 2 is a perspective view of the tool of FIG. 1 disposed on a blade root, shown aligned with the bushing holes of the blade using alignment pins.
Figure 3:
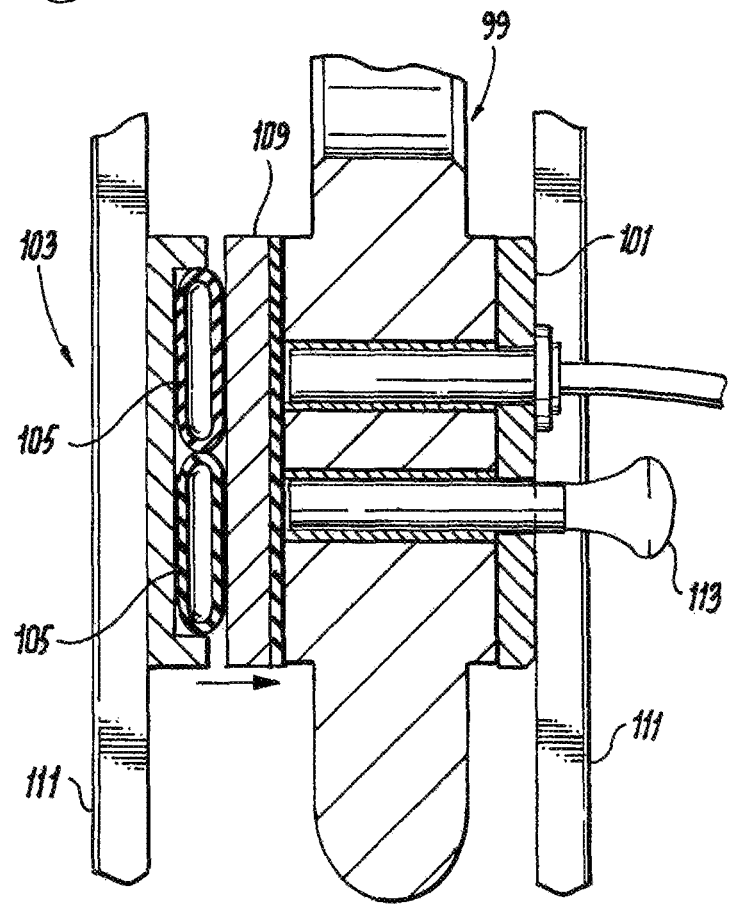
FIG. 3 is a cross-sectional view of the tool of FIG. 1, shown disposed on the blade root and having a heat rod placed in the bushing to heat the bushing.
Figure 4:
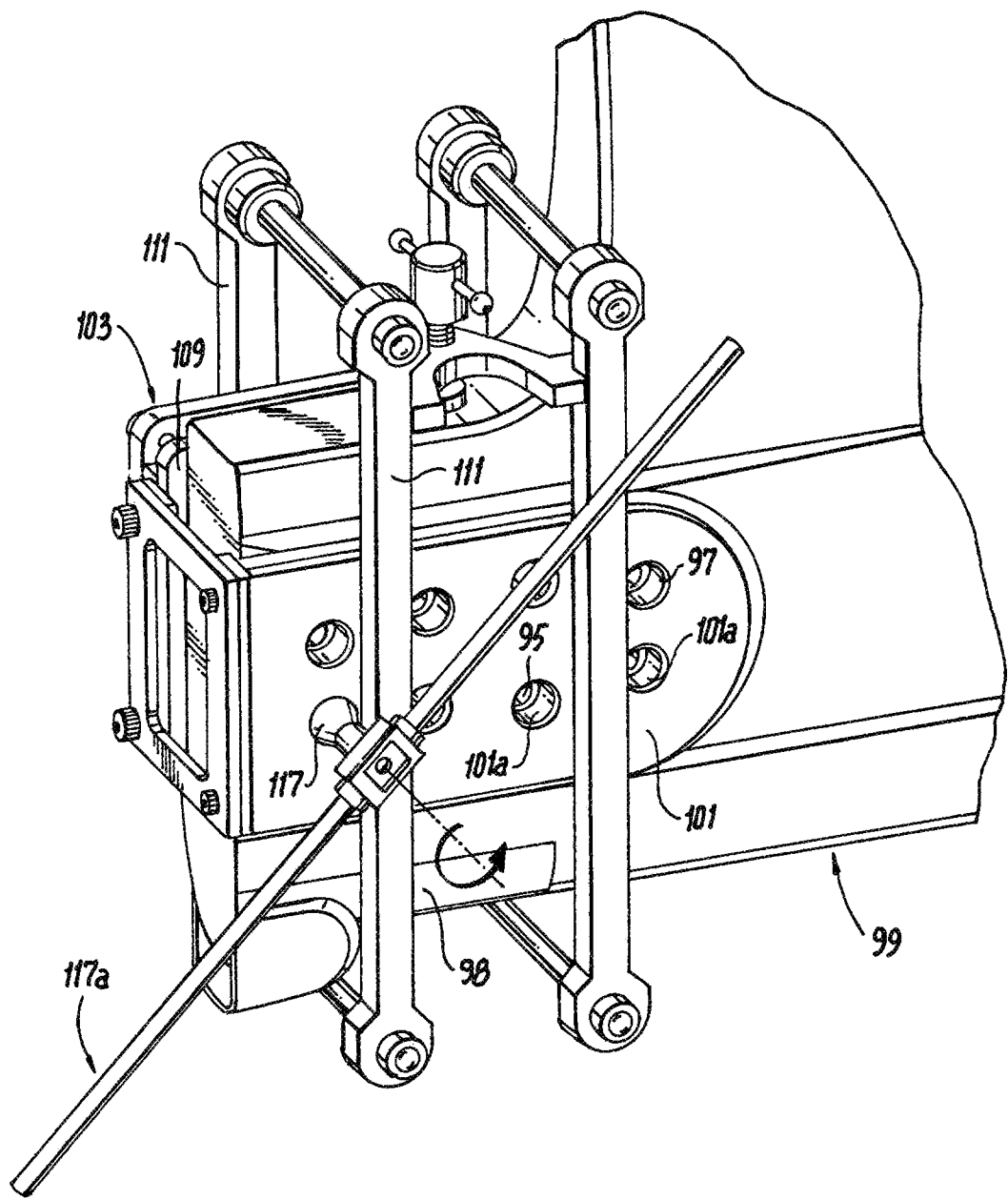
FIG. 4 shows a perspective view of the tool of FIG. 1, shown disposed on the blade root and having a removal tool disposed within a bushing to loosen and remove the bushing after heating.

Reference will now be made to the drawings wherein like reference numerals identify similar structural features or aspects of the subject disclosure. For purposes of explanation and illustration, and not limitation, an illustrative view of an embodiment of a tool in accordance with the disclosure is shown in FIG. 1 and is designated generally by reference character 100. Other embodiments and/or aspects of this disclosure are shown in FIGS. 2-4. The systems and methods described herein can be used to remove bushings from a blade without damaging the blade or otherwise removing material from the blade.

Referring to FIG. 1, a cuff-blade attachment bushing removal tool 100 for removing bushings 95 from a blade 99 is shown. The tool 100 includes an alignment plate 101 comprising alignment holes 101a defined through the alignment plate 101 in a pattern of a plurality of bushing holes 97 of a blade root 98 of a blade 99. The tool 100 also includes a bladder plate 103 connected to the alignment plate 101 (e.g., via a frame).

The tool 100 also has a bladder 105 positioned on the bladder plate 103 such that a gap 107 is formed between the bladder 105 and the alignment plate 101 to receive a blade root 98 to align the alignment holes 101a and the bushing holes 97 of the blade root 99. The bladder 105 is transitionable between an uninflated position where the blade root 98 can be inserted into the gap 107 and an inflated position where the blade root 98 is clamped between the bladder 105 and the alignment plate 101. The bladder 103 can be inflated in any suitable manner (e.g., via a hose 103a connected to a pressure source).

The tool 100 can include a plurality of frame arms 111 extending from the alignment plate 101 and the bladder plate 103. The frame arms 111 can be connected together to form a frame of the tool 100 to hold the alignment plate 101 and the bladder plate 103 in position relative to each other (e.g., adjustably, slidably, permanent, or otherwise). In certain embodiments, the tool 100 can include a bladder retainer 109 connected to the bladder plate 103 to retain the bladder 105 to the bladder plate 103, e.g., such that the bladder 105 is sandwiched (e.g., at a boarder of the bladder 105) between the bladder retainer 109 and the bladder plate 103. The bladder retainer 109 can include a soft surface (e.g., silicone, rubber, or otherwise) to pad the bladder retainer 109 where the bladder retainer 109 contacts the blade 99, for example.

Referring to FIG. 2, the system can further include a plurality of alignment pins 113 configured to insert through the alignment holes 101a and into bushings 95 within the bushing holes 97. The alignment pins 113 can be of any suitable shape and/or size to register the pattern of alignment holes 113 with the bushing holes 97/bushings 95.

Referring to FIG. 3, the system can further include a heating rod 115 configured to insert through the alignment holes 101a and into bushings 95 in the bushing holes to uniformly heat the bushings 95. The heating rod 115 can be heated in any suitable manner (e.g., an electric heater) and can include any suitable shape and/or size to uniformly heat the bushings.

Referring to FIG. 4, the system can further include a removal tool 117 (e.g., with a torque handle 117a) configured to insert through the alignment holes 101a and into bushings 95 in the bushing holes 97. The removal tool 117 can interface with the bushings 95 to remove the bushings 95 from the bushing holes 97. For example, the removal tool 117 can have a gripping surface and/or an expanding portion to grip the inner surface of bushing 95. Any other suitable configuration for the removal tool is contemplated herein.

In accordance with at least one aspect of this disclosure, a method for removing a cuff-blade attachment bushing 95 from within one or more of a plurality of bushing holes 97 defined in a blade 99 can include uniformly heating the bushing 95 with a heating rod 115 for a predetermined period of time. After heating, the method can include working the bushing 95 to loosen an adhesive bond between the bushing 95 and its respective bushing hole 97 to remove the bushing 95 from its respective bushing hole 97. Working the bushing 95 can include using a removal tool 117 (e.g., as described above such as an easy-out tool/large screw extractor). Using the removal tool 117 can include rotating the removal tool 117 to loosen the adhesive bond. In certain embodiments, using the removal tool 117 can include rotating and pulling the removal tool 117 to remove the bushing 95.

The method can further include aligning a plurality of alignment holes 101a of an alignment plate 101 of a tool 100 with the plurality of bushing holes 97. The method can then include inserting one or more alignment pins 113 into at least two bushings 95 and/or bushing holes 97 before uniformly heating the bushing 95 with the heating rod 115.

The method can include inflating a bladder 105 on an opposite side of the blade 99 relative to the alignment plate 101 to hold the blade 99 within the tool 100 after alignment and before uniformly heating the bushing 95 to maintain pressure on a bond line of laminated layers to prevent delamination. The method can include cleaning the bushing hole 97 (e.g., by hand) to remove excess adhesive.

As described above, a controlled heat source can be applied directly to the inner diameter of the cuff-to-blade attachment bushings. In addition to the localized heat, a pressure bladder 105 can maintains sufficient beam width pressure to the surrounding structure while the heat affected area is near its Glass Transition Temperature state to prevent existing bond line degradation. Once each bushing has heat soaked the predetermined duration the heat source can be removed and a removal tool 117 (e.g., an easy out tool) can be installed in the bushing 95 to be removed. The bushing 95 can be broken free and removed by spinning in, e.g., a counterclockwise direction. The process can be repeated for all bushings 95.

The traditional approach for removing bushings of this type would be to perform a machine set up and mechanically cut the bushings out. The bushings are bonded in the blade with a floating bond line and are not concentric with the hole in the blade spar. No relevant datum structure exists as the machine datum is removed during the last machining operation in the manufacturing process. A benefit of the local controlled heat and rotation removal is the adhesive surrounding the bushing 95 is rolled during removal and can be cleaned by hand operations. This eliminates a follow on machine operation that could compromise the concentricity or true position of the individual holes within the pattern, for example.

The embodiments of the present disclosure, as described above and shown in the drawings, provide for cuff-blade attachment bushing removal with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for removing a cuff-blade attachment bushing from within one or more of a plurality of bushing holes defined in a blade, comprising:
 uniformly heating the bushing with a heating rod for a predetermined period of time; and
 after heating, working the bushing to loosen an adhesive bond between the bushing and its respective bushing hole to remove the bushing from its respective bushing hole.

2. The method of claim 1, wherein working the bushing includes rotating a removal tool to loosen the adhesive bond.

3. The method of claim 2, wherein using the removal tool includes rotating and pulling the removal tool to remove the bushing.

4. The method of claim 1, further comprising aligning a plurality of alignment holes of an alignment plate of a tool with the plurality of bushing holes and inserting an alignment pin into at least two bushings and/or bushing holes before uniformly heating the bushing with the heating rod.

5. The method of claim 1, further comprising inflating a bladder on an opposite side of the blade relative to the alignment plate to hold the blade within the tool after alignment and before uniformly heating the bushing to maintain pressure on a bond line of laminated layers to prevent delamination.

6. The method of claim 1, further comprising cleaning the bushing hole to remove excess adhesive.

\* \* \* \* \*